(12) United States Patent
Chen et al.

(10) Patent No.: US 12,534,416 B2
(45) Date of Patent: Jan. 27, 2026

(54) COATING COMPOSITIONS, METHODS OF MAKING AND USES THEREOF

(71) Applicant: James Hardie Technology Limited, Dublin (IE)

(72) Inventors: Yongjun Chen, Rancho Cucamonga, CA (US); Caidian Luo, Rancho Cucamonga, CA (US); Luan Giang, Rancho Cucamonga, CA (US)

(73) Assignee: James Hardie Technology Limited, Dublin (IE)

( * ) Notice: Subject to any disclaimer, the term of this patent is extended or adjusted under 35 U.S.C. 154(b) by 87 days.

(21) Appl. No.: 18/556,320

(22) PCT Filed: Apr. 20, 2022

(86) PCT No.: PCT/EP2022/060466
§ 371 (c)(1),
(2) Date: Oct. 19, 2023

(87) PCT Pub. No.: WO2022/223648
PCT Pub. Date: Oct. 27, 2022

(65) Prior Publication Data
US 2024/0190782 A1      Jun. 13, 2024

Related U.S. Application Data

(60) Provisional application No. 63/177,735, filed on Apr. 21, 2021.

(51) Int. Cl.
*C04B 41/52* (2006.01)
*C04B 7/02* (2006.01)
(Continued)

(52) U.S. Cl.
CPC .............. *C04B 41/524* (2013.01); *C04B 7/02* (2013.01); *C04B 14/06* (2013.01);
(Continued)

(58) Field of Classification Search
CPC ..................................................... C04B 41/524
See application file for complete search history.

(56) References Cited

U.S. PATENT DOCUMENTS

| 10,604,453 B1* | 3/2020 | Peng ...................... C04B 41/009 |
| 2003/0121453 A1* | 7/2003 | Iwahashi .................. C09D 7/42 |
| | | 106/404 |

(Continued)

OTHER PUBLICATIONS

WaybackMachine Archive (https://web.archive.org/web/20201031183748/https://custompaintinginc.com/painting-contractors-alamo-is-tsp-necessary-when-painting-your-home/) (Oct. 2020).*

(Continued)

*Primary Examiner* — Austin Murata
(74) *Attorney, Agent, or Firm* — Knobbe, Martens, Olson & Bear, LLP (57) ABSTRACT

A coated building article comprising a fiber cement cladding element may be coated with a system designed to achieve a desired appearance. The coating system may comprise a first coating layer and a second coating layer wherein the second coating layer comprises at least one layer of a low gloss coating composition which has a light reflectance of 5% or less when light is shone onto the surface of the coated article at an angle of 60° or 85° to the surface is positioned on at least a portion of the front face of the fiber cement cladding element. Also provided is a method of coating the building article with a low gloss coating composition.

20 Claims, 3 Drawing Sheets

(51) Int. Cl.
    *C04B 14/06*     (2006.01)
    *C04B 20/00*     (2006.01)
    *C04B 28/04*     (2006.01)
    *C04B 41/45*     (2006.01)
    *C04B 111/80*     (2006.01)

(52) U.S. Cl.
    CPC .......... *C04B 20/0048* (2013.01); *C04B 28/04* (2013.01); *C04B 41/4543* (2013.01); *C04B 2111/80* (2013.01)

(56) References Cited

U.S. PATENT DOCUMENTS

| | | | |
|---|---|---|---|
| 2006/0105161 | A1 | 5/2006 | Brandenburger et al. |
| 2007/0283650 | A1* | 12/2007 | Schwan .............. E04G 21/1841 52/396.08 |
| 2009/0139435 | A1 | 6/2009 | Hertz et al. |
| 2012/0047837 | A1* | 3/2012 | Schaefer .............. E04F 13/148 52/519 |
| 2012/0192517 | A1* | 8/2012 | Bezubic, Jr. .............. E04C 2/04 427/372.2 |

OTHER PUBLICATIONS

International Search Report and Written Opinion dated Aug. 16, 2022 for Application No. PCT/EP2022/060466.

\* cited by examiner

COATING COMPOSITIONS, METHODS OF MAKING AND USES THEREOF

CROSS-REFERENCE TO RELATED APPLICATIONS

This application is the U.S. National Phase of International Application No. PCT/EP2022/060466, filed Apr. 20, 2022, entitled "COATING COMPOSITIONS, METHODS OF MAKING AND USES THEREOF", which claims the benefit of U.S. Provisional Application No. 63/177,735, filed Apr. 21, 2021, entitled "COATING COMPOSITIONS, METHODS OF MAKING AND USES THEREOF", which are hereby incorporated by reference in their entireties and for all purposes.

FIELD

The present disclosure relates to coating compositions suitable for use on fiber cement building elements. In particular, the disclosure relates to low gloss coating compositions suitable for use on textured fiber cement building elements.

The embodiments have been developed primarily for use as cladding elements and will be described hereinafter with reference to this application. However, it will be appreciated that the embodiments are not limited to this particular field of use and that the embodiments can be used as building elements or other in any suitable field of use known to the person skilled in the art.

BACKGROUND

Any discussion of the prior art throughout the specification should in no way be considered as an admission that such prior art is widely known or forms part of the common general knowledge in the field.

Cladding elements are primarily used to protect building walls and other structures. In addition, cladding elements can be used to provide desirable aesthetic finishes to building walls and/or other structures. Cladding elements comprise both timber and non-timber materials, wherein the non-timber materials include for example, fibre cement. Fibre cement cladding elements are provided with many different types of finishes including a smooth finish or a textured surface finish, such as for example textures that resemble a woodgrain aesthetic, a stucco or render type aesthetic, a brick aesthetic or other similar type aesthetics.

Coating compositions applied to cladding elements, particularly fiber cement cladding elements, provide a dual function. They enhance the aesthetic appearance of the fiber cement cladding element through color and gloss finishes whilst also providing protection against environmental effects such as weathering.

SUMMARY

The present disclosure relates generally to a coating composition suitable for use on fiber cement and other composite building materials.

The embodiments have been developed primarily for use on textured fiber cement elements or articles and will be described hereinafter with reference to this application. However, it will be appreciated that the embodiments are not limited to this field of use and that the embodiments can be used indeed on smooth fiber cement or indeed in any suitable field of use known to the person skilled in the art.

In one embodiment of the present disclosure, there is provided a coated fiber cement cladding element comprising: a front face, a rear face and a side face, wherein the rear face is spaced apart from front face and the side face is between and contiguous to the front face and the rear face and wherein the front face further comprises a textured finish; a first coating layer on at least a portion of the front face of the fiber cement cladding element; and a second coating layer on at least a portion of the first coating layer on at least a portion of the front face of the fiber cement cladding element, wherein the second coating layer comprises at least one layer of a low gloss coating composition which has a light reflectance of 5% or less when light is shone onto the surface of the coated fiber cement cladding element at an angle of 60° or 85° to the surface.

In one embodiment, the first coating layer comprises a sealer layer. In another embodiment, the first coating layer comprises a primer layer. In a further embodiment, the first coating layer comprises a combined sealer and primer layer. In another embodiment, the first coating layer comprises a sealer layer and a separate primer layer. In one embodiment, the second coating layer comprises a coating composition that is suitable for use as an exterior coating composition, the coating composition having a light reflectance of at least 10% or higher when light is shown on the surface of the coated article at an angle of 60° or 85° to the surface when applied to a smooth surface; and a treatment agent whereby the treatment agent reduces the gloss of the coating composition such that the second coating layer comprises at least one layer of a low gloss coating composition which has a light reflectance of 5% or less when light is shone onto the surface of the coated fiber cement cladding element at an angle of 60° or 85° to the surface. In further embodiments, the second coating layer is applied at a dried film thickness of between approximately 0.04 millimeter and 0.1 millimeter.

In further embodiments, the treatment agent is either trisodium phosphate or monosodium phosphate. In another embodiment, the treatment agent is applied to the coating composition such that the total amount of treatment agent is less than 2.42 g/m². In some embodiments, the wt. % concentration of the treatment agent is between 3.75 wt. % and 10 wt. %. In other embodiments, the wt. % concentration of the treatment agent is 5 wt. % and is applied at a dosage rate between 1.6 g/m² and 1.9 g/m². In another embodiment, the wt. % concentration of the treatment agent is 9 wt. % and is applied at a dosage rate of 1.74 g/m². In some embodiments, the wt. % concentration of the treatment agent is 5 wt. % concentration and is applied at a dosage rate between 0.97 g/m² and 2.58 g/m².

In certain embodiments, the textured finish of the front face comprises a stucco or a render finish. In further embodiments, the textured finish of the front face comprises a woodgrain aesthetic, a brick aesthetic or a stone aesthetic. In another embodiment, the textured finish of the front face further comprises a contoured surface.

In one embodiment, the coated fiber cement cladding element comprises a fiber cement composition comprising Portland cement, silica, water and reinforcing fibres. In one embodiment, the reinforcing fibers comprise cellulose fibers or synthetic fibers or a combination of cellulose and synthetic fibers. Some embodiments comprise a fiber cement composition comprising between 20 and 40 wt. % Portland cement, between 25 and 75 wt. % silica, water and between 5 and 15 wt. % of reinforcing fibers relative to the dry weight of the total composition. In some embodiments, the fiber cement composition optionally further comprises one or more density modifiers and/or any other suitable additional additives known to a person skilled in the art. It is to be understood that the wt. % of the total fiber cement composition must be 100 wt % and the wt. % of the individual components when added together must equal 100 wt %.

Some embodiments relate to a method of coating a fiber cement cladding element comprising the steps of:
  providing a fiber cement cladding element comprising a front face, a rear face and a side face, wherein the rear face is spaced apart from the front face and the side face is between and contiguous to the front face and the rear face and wherein the front face further comprises a textured finish;
  applying a first coating layer on the front face of the fiber cement cladding element;
  applying an untreated second coating layer on top of the first coating layer on the front face of the fiber cement cladding element;
  applying a treatment agent to the untreated second coating layer whilst the untreated second coating layer is wet to provide a treated second coating layer;
  curing the treated second coating layer to provide a coated fiber cement cladding element wherein the treated second coating layer is a low gloss coating composition having a light reflectance of 5% or less when the light is shown on the surface of the coated article at an angle of 60° or 85° to the surface.

In some embodiments, a third coating layer is applied on top of the first coating layer, prior to the application of the untreated second coating layer. In additional embodiments, the third coating layer is comprised of a coating composition that is the same as the coating composition of the untreated second coating layer.

In some embodiments, the untreated second coating layer comprises a coating composition that is suitable for use as an exterior coating composition which has a light reflectance of at least 10% or higher when light is shown on the surface of the coated article at an angle of 60° or 85° to the surface when applied to a smooth surface. In further embodiments, the untreated second coating layer is applied at a dried film thickness of between approximately 0.04 millimeter and 0.1 millimeter.

In further embodiments, the treatment agent is either trisodium phosphate or monosodium phosphate. In another embodiment, the treatment agent is applied to the untreated second coating layer such that the total amount of treatment agent is less than 2.42 g/m². In some embodiments, the wt % concentration of the treatment agent is between 3.75 wt % and 10 wt %. In other embodiments, the wt % concentration of the treatment agent is 5 wt % and is applied at a dosage rate between 1.6 g/m² and 1.9 g/m². In another embodiment, the wt % concentration of the treatment agent is 9 wt % and is applied at a dosage rate of 1.74 g/m². In some embodiments, the wt % concentration of the treatment agent is 5 wt % concentration and is applied at a dosage rate between 0.97 g/m² and 2.58 g/m².

In some embodiments, curing the treated second coating layer to provide a coated fiber cement cladding element wherein the treated second coating layer is a low gloss coating composition having a light reflectance of 5% or less when the light is shown on the surface of the coated article at an angle of 60° or 85° to the surface occurs within approximately 0.5 and 6 minutes after application of the treatment agent. In another embodiment, the first coating layer comprises a sealer layer. In a further embodiment, the first coating layer comprises a primer layer. In another embodiment, first coating layer comprises a combined sealer and primer layer. In one embodiment, the first coating layer comprises a sealer layer and a separate primer layer.

In some embodiments, the treatment agent is applied to the surface of the wet untreated second coating layer using spraying techniques. In other embodiments, the treatment agent is applied to the surface of the wet untreated second coating layer using a flat spray nozzle pattern.

BRIEF DESCRIPTION OF THE DRAWINGS

Certain embodiments of the present disclosure will now be described, by way of example only, with reference to the accompanying drawings. From figure to figure, the same or similar reference numerals are used to designate similar components of an illustrated embodiment.

DETAILED DESCRIPTION

Although making and using various embodiments are discussed in detail below, it should be appreciated that the embodiments described provide inventive concepts that may be embodied in a variety of contexts. The embodiments discussed herein are merely illustrative of ways to make and use the disclosed devices, systems and methods and do not limit the scope of the disclosure.

In the description which follows like parts may be marked throughout the specification and drawing with the same reference numerals, respectively. The drawing figures are not necessarily to scale and certain features may be shown exaggerated in scale or in somewhat generalized or schematic form in the interest of clarity and conciseness.

Generally, when coating building elements such as cladding materials, particularly those cladding elements that are used in an exterior application, glossy or semigloss coating compositions are used. Glossy or semi-gloss coatings provide a robust durable finish which are suitable for external application. Glossy or semi-gloss coating compositions generally exhibit a light reflectance of 40% or greater when light is shone onto the surface of the coated article at an angle of 60° to the surface.

In certain circumstances, it is sometimes desirable to use low gloss coatings that exhibit a much lower degree of reflectivity than glossy or semi-gloss coating compositions as such coating compositions provide an aesthetically pleasing result particularly when coating a textured surface. Low gloss coating compositions generally exhibit a light reflectance of 25% or less when light is shone onto the surface of the coated article at an angle of 60° or 85° to the surface. However, the lower the gloss level the more difficult it is to maintain the coating composition when in use. Consequently, low gloss coating compositions are generally only used in interior applications rather than exterior applications. Coatings that have a very low gloss level i.e., exhibiting a light reflectance of 7% or less when light is shone onto the surface of the coated article at an angle of 60° or 85° to the surface, are generally not used in exterior applications.

The gloss level of a paint is often associated with the ratio of binder and pigment in the dried paint film. The ratio of the volume of pigment present in the coating to the volume of the binder and pigment material present in the coating is expressed as Pigment Volume Concentration (PVC) wherein, PVC is calculated as being equal to the volume of pigment ($V_p$) divided by the volume of total solids ($V_p+V_b$) wherein $V_p$ is the volume of pigment and $V_b$ is the volume of binder.

Coating compositions that have a low PVC ratio which have high quantities of binder to pigment particles tend to have a high gloss appearance with a high degree of reflectivity. In contrast coating compositions that have a high PVC ratio which have low quantities of binder to pigment particles tend to have a low gloss appearance with a low degree of reflectivity. Thus, a low gloss coating composition generally comprises more pigment particles and less binder particles in the overall composition. It is recognized that the mechanical and/or performance properties of coating compositions comprising high PVC values usually decrease as there is sometimes insufficient quantities of binder particles to completely cover and fill the space between pigment particles in the coating. Such coatings are generally not applicable for use in an external application or indeed in areas of high traffic.

Alternatively, in some circumstances, it is possible to physically disrupt a dried coating film that has formed on a substrate by abrading the dried high gloss coating which roughens the coating surface thereby reducing the light reflectance capacity of the coating. However, such treatments are known to damage the coating surface to the extent that it is often not suitable to use such coatings in an exterior application.

The present disclosure provides a building element that is coated with a very low gloss coating composition that is suitable for use in an exterior application.

Figure 1:
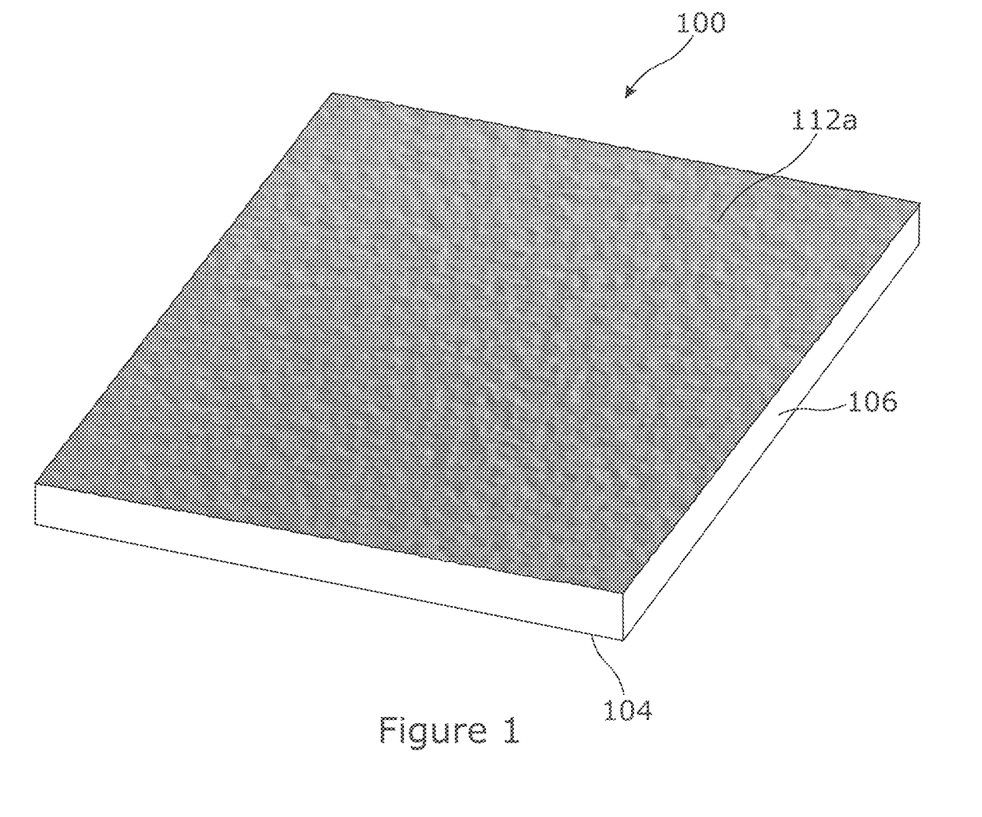
FIG. 1 is a perspective view of one example of a coated textured fiber cement board in accordance with the present disclosure.
Figure 2:
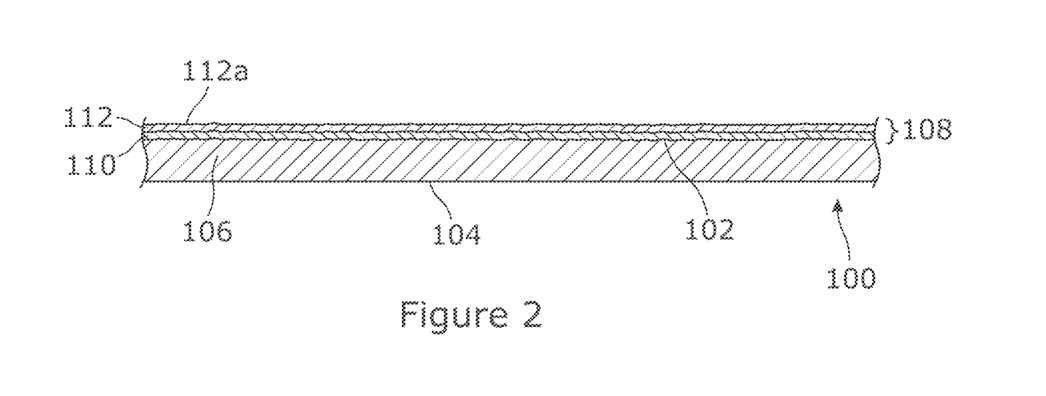
FIG. 2 is a cross-sectional view of the exemplary coated textured fiber cement board of FIG. 1.

Referring now to FIGS. 1 and 2, which show a perspective and a cross-sectional view of an exemplary embodiment of a coated building element in accordance with the present disclosure. In the exemplary embodiment shown, the building element comprises a fiber cement cladding element 100 comprising a front face 102, a rear face 104 and side face 106. Rear face 104 is spaced apart from front face 102. As shown in FIG. 2, in the exemplary embodiment front face 102 and rear face 104 are opposite to each other. Side face 106 is positioned between front face 102 and rear face 104 and is contiguous to both the front face 102 and rear face 104. Side face 106 can also be referred to as an edge member of fiber cement cladding element 100. In the exemplary embodiments, fiber cement cladding element 100 can be formed from a fiber cement composition including fibers such as cellulose and/or synthetic fibers (e.g., polypropylene), Portland cement, silica and water. In some embodiments, the fiber cement composition further comprises density modifiers and/or other additional additives known to a person skilled in the art.

An exemplary dry weight % fiber cement composition is outlined below in Table One.

TABLE 1

WEIGHT PERCENT RANGES OF COMPONENTS THAT MAY BE INCLUDED IN A FIBER CEMENT COMPOSITION.

| Components | Range wt % |
| --- | --- |
| Portland Cement | 20-40 |
| Silica | 25-75 |
| Fiber | 5-15 |
| Density Modifiers | 0-10 |
| Additives | 0-10 |

In the exemplary embodiment shown in FIG. 2, cladding element 100 comprises a textured finish on the front face 102 (or a portion thereof) which replicates the appearance of stucco or render. In alternative embodiments, cladding element 100 comprises a smooth finish or an alternate textured pattern, such as, for example a woodgrain aesthetic, a brick aesthetic, a stone aesthetic, or other similar type aesthetics which enhance the finished appearance of the cladding element 100, and in turn, an exterior of the structure when installed thereon. In other exemplary embodiments, cladding element 100 can include other textured and/or contoured surface finishes that provide an array of aesthetic finishes. In one example, such aesthetic finishes could include a ribbed textured effect.

In the exemplary embodiment shown in FIG. 2, cladding element 100 further comprises a coating system 108 on the front face 102. Coating system 108 comprises at least a first coating layer 110 and a second coating layer 112. The first coating layer 110 can also be referred to as a base layer whilst the second coating layer 112 can also be referred to as a topcoat layer. The finished architecture or topography of the front face 102 of the cladding element 100 is visible in the coated fiber cement building element 100 as indicated by top surface 112a of FIGS. 1 and 2.

In some exemplary embodiments first coating layer or base layer 110 comprises a sealer layer. In an alternate exemplary embodiment first coating layer 110 comprises a primer layer. In a further exemplary embodiment, first coating layer 110 comprises a combined sealer primer layer. In a further alternate exemplary embodiment, first coating layer 110 comprises a sealer layer and a primer layer. In some instances, the first coating layer or base layer 110 comprises one or more layers. In some embodiments, the sealer is epoxy based. In some embodiments, the sealer is acrylic based. In some embodiments, the sealer is tinted. In some embodiments, the sealer is not tinted. In some embodiments, the sealer tint comprises an organic compound. In some embodiments, the sealer tint comprises an inorganic compound.

In the present disclosure, second coating layer or topcoat layer 112 comprises at least one layer of a low gloss coating composition which is suitable for exterior application as will be described further below. In the exemplary embodiments, second coating layer 112 comprises at least one layer of a low gloss coating composition which has a light reflectance of 5% or less when light is shone onto the surface of the coated article at an angle of 60° or 85° to the surface. Furthermore, in the exemplary embodiments and as will also be described further below, second coating layer 112 exhibits performance durability attributes that are characteristic of a coating composition that is suitable for exterior application thus rendering the coating system of the present disclosure suitable for use in an exterior application.

Figure 3:
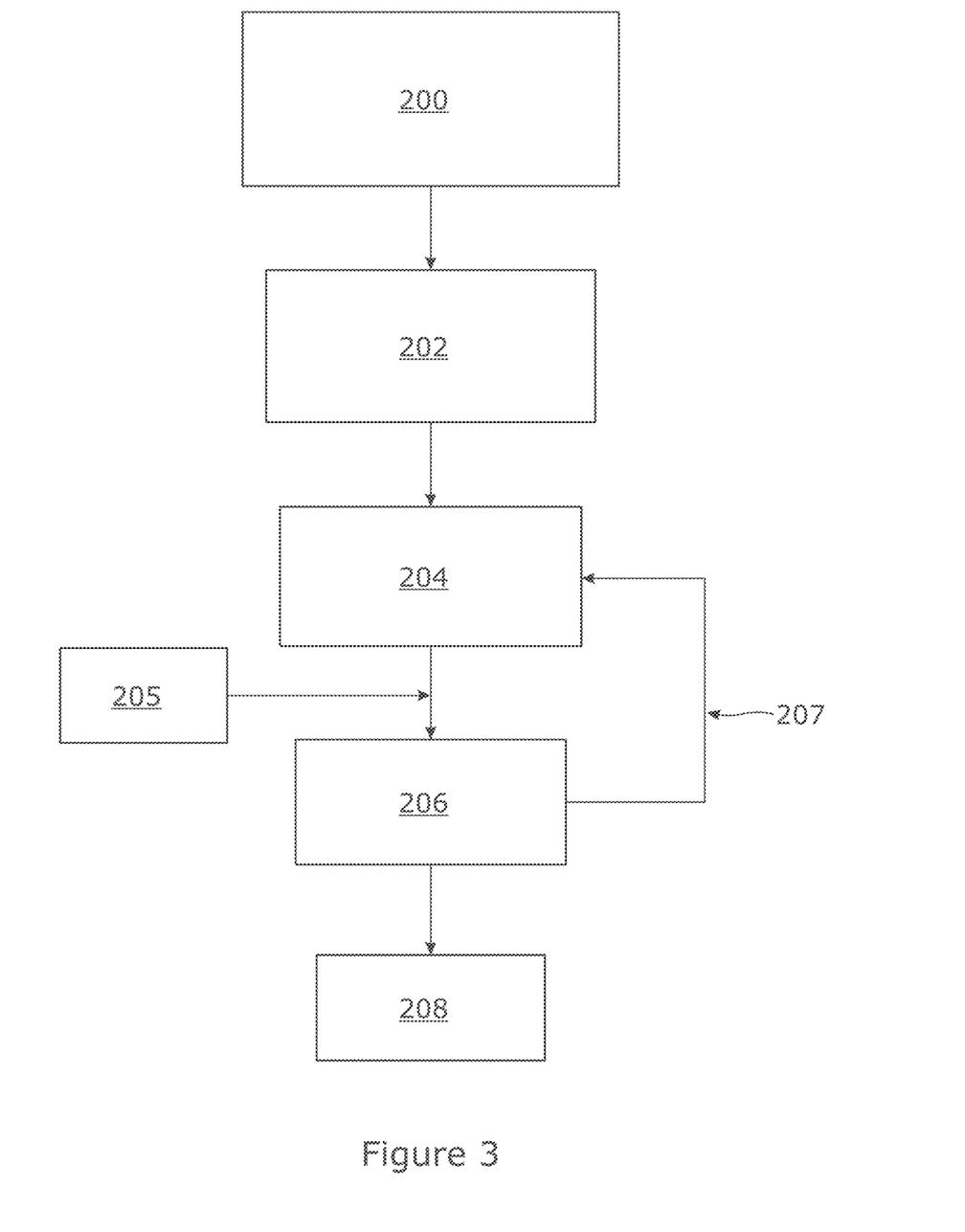
FIG. 3 is a flow diagram showing one exemplary embodiment of a process in accordance with the present disclosure.

The present disclosure also provides method of coating a building element such as the exemplified fiber cement cladding element 100 of FIG. 1. FIG. 3 illustrates one method of coating a building element in accordance with the present disclosure comprising the steps of: providing a building element at step 200; applying a first coating layer on the front face of the building element at step 202; applying a second coating layer on the front face of the building element on top of the first coating layer at step 204; applying a treatment agent to the second coating layer on the front face of the building element at step 205 whilst the second coating layer is wet; curing the treated second coating layer on the front face of the building element at step 206 to provide a coated building element at step 208 wherein the treated second coating layer on the front face of building element that is cured at step 206 results in a low gloss coating composition having a light reflectance of 5% or less when the light is shown on the surface of the coated article at an angle of 60° or 85° to the surface.

In a further embodiment of the method of coating a building element, after curing the treated second coating layer on the front face of the building element at step 206, the end user can apply a further second coating layer on the front face of the building element at step 204 and apply a further treatment agent at step 205, thereby repeating steps 204, 205 and 206 as indicated by arrow 207. Conveniently, these steps can be repeated as desired by the end user.

In a further exemplary embodiment of the method of coating a building element wherein multiple layers of the second coating layer are being applied to the front face of the building element after step 206, it is possible to omit the step of applying a treatment agent to the second coating layer on the front face of the building element at step 205 until the uppermost layer of the second coating layer has been applied on the front face of the building element at step 204 if so desired by the end user.

The method of the present disclosure as illustrated in FIG. 3 will now be described in greater detail with respect to FIGS. 1 and 2. A building element such as a fiber cement cladding element as described above and as exemplified by fiber cement cladding element 100 of FIGS. 1 and 2 is provided in step 200. A first coating layer 110 is applied to the front face of fiber cement cladding element 100 as exemplified in FIG. 2 in Step 202. As described above, in the exemplary embodiments herein described, first coating layer or base layer 110 comprises either a sealer layer, a primer layer, a sealer layer and a primer layer, or a combined sealer primer layer. First coating layer is allowed to cure before a second coating layer 112 is applied on top of the first coating layer or base layer 110 at step 204.

Second coating layer 112 comprises any coating composition that is suitable for use as an exterior coating composition which has a light reflectance of at least 10% or higher when the light is shown on the surface of the coated article at an angle of 60° or 85° to the surface when applied to a smooth surface. In one embodiment, second coating layer 112 is applied at a dried film thickness (DFT) of between approximately 0.04 millimeter and 0.1 millimeter. After application of second coating layer 112, a treatment agent is applied to the second coating layer 112 at step 205 whilst the second coating layer 112 is wet before the second coating layer 112 is cured at step 206 of the exemplary method. In some exemplary embodiments of the present disclosure the treated second coating layer 112 is cured at step 206 within a flash time of approximately 0.5 and 6 minutes after application of the treatment agent. This provides sufficient time to allow the treatment agent to interact with the coating composition and sufficiently disrupt the film formation to reduce the gloss levels of the coating composition to the desired levels.

In some exemplary embodiments, the cured coated and treated fiber cement cladding element 100 is returned to step 204 via step 207 for application of further layers of second coating layer 112 and treatment agent at steps 204 and 205 of the method. In such exemplary embodiments, the DFT of the cumulative layers of the second coating layer 112 is between approximately 0.04 millimeter and 0.1 millimeter. Any further layers of the second coating layer 112 are fully cured at step 206 until the desired finished coated building element is formed at step 208. In further exemplary embodiments, wherein more than one second coating layer 112 is applied on top of the first coating layer 110, only the final or top second coating layer 112 is treated at step 205.

In the exemplary embodiments, the treatment agent is either trisodium phosphate (TSP) or monosodium phosphate (MSP). Application of the treatment agent will be described in greater detail below. Without wishing to be bound by theory, it is considered that the treatment agent interacts with the surface of the uppermost second coating layer 112 prior to curing to prevent the formation of a continuous film at top surface 112a thereby creating a surface roughness in top surface 112a which impacts the gloss level of the second coating layer without impacting the integrity and durability of the overall second coating layer 112. The treated second coating layer 112 is cured at step 206 very quickly after application of the treating agent at step 205. This enables the second coating layer 112 to maintain its original color and durability properties because the treating agent only impacts the top surface 112a of the second coating layer 112.

In the exemplary embodiments, the treatment agent is preferably applied to the surface of the wet second coating layer 112 using spraying techniques such as, for example, a flat spray nozzle pattern. It is possible to alter the spray angles and sweep speed as desired to control the desired dosage weight as outlined below.

Figure 4A:
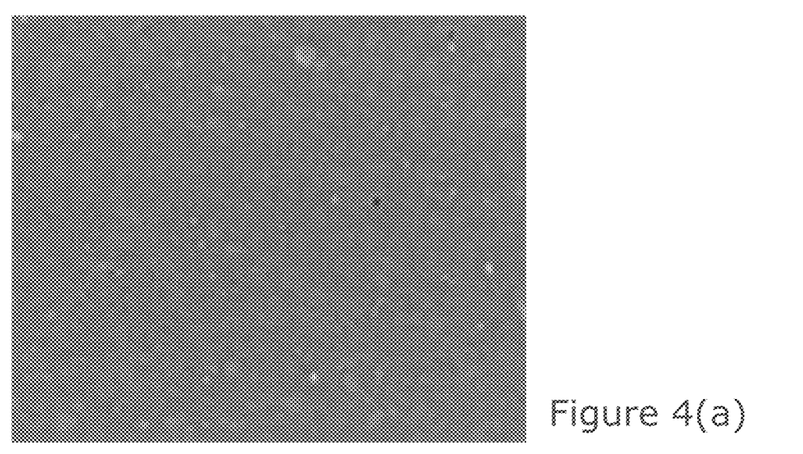
FIG. 4(a) is a microscopy image of the surface morphology of a commercially available paint.
Figure 4B:
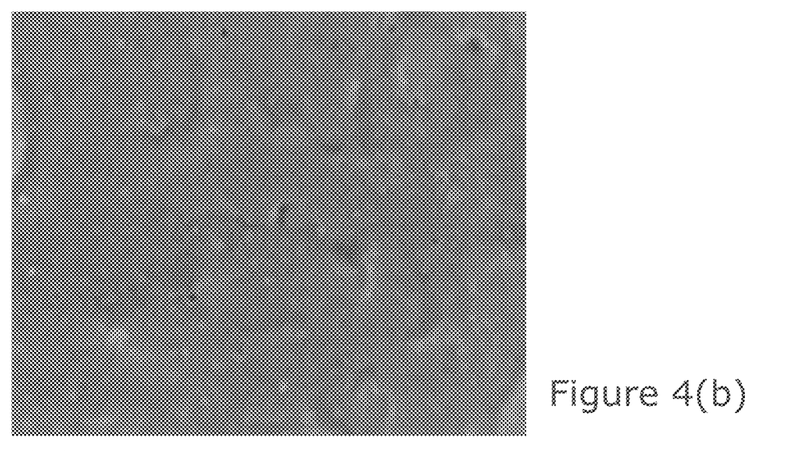
FIG. 4(b) is a microscopy image of the surface morphology of a commercially available paint after applying one treatment agent in accordance with the present disclosure.
Figure 4C:
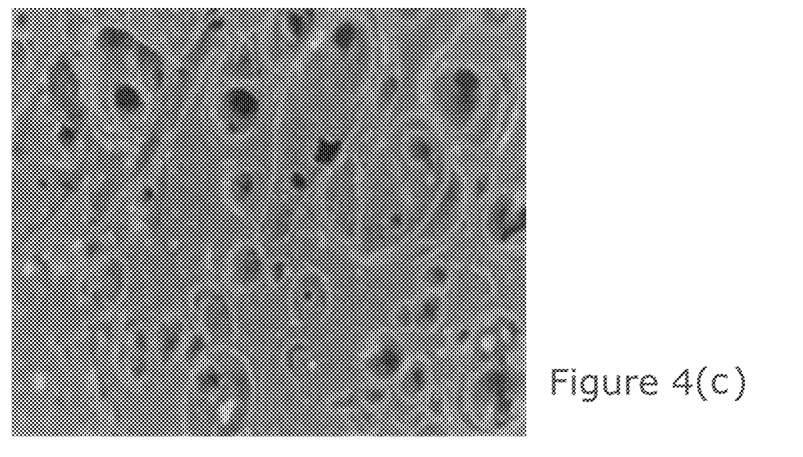
FIG. 4(c) is a microscopy image of the surface morphology of a commercially available paint after applying an alternative treatment agent in accordance with the present disclosure.

Turning now to FIGS. 4(*a*), 4(*b*) and 4(*c*), there is shown microscopic images of a section of the surface 112a of coated fiber cement cladding element 100 as shown in FIGS. 1 and 2. FIG. 4(*a*) is a microscopic image of a section of the surface 112a of the coated fiber cement cladding element 100 which has not been treated in accordance with the method of the present disclosure and is acting as a control. FIGS. 4(*b*) and 4(*c*) are microscopic images of a section of the surface 112a of the coated fiber cement cladding element 100 which has been treated in accordance with the method of the present disclosure by TSP and MSP respectively. Both TSP and MSP when used as treatment agents interfere with the film formation at the surface 112a of the coated fiber cement cladding element 100 preventing a smooth film formation similar to that shown by the untreated control as shown in FIG. 4(*a*).

The treatment agent (e.g., TSP or MSP) was applied to the second coating layer 112 when wet such that the total amount of treatment agent applied to the second coating layer was less than 2.42 $g/m^2$ in order to achieve the desired interference between the treatment agent and top surface 112a. In one embodiment, the treatment agent (e.g., TSP or MSP) was applied to the second coating layer 112 when wet such that the total amount of treatment agent applied to the second coating layer was at a dosage rate between approximately 0.97 $g/m^2$ and approximately 2.42 $g/m^2$ in order to achieve the desired interference between the treatment agent and top surface 112a. If the concentration and/or dosage amounts are too low (e.g., less than 0.97 $g/m^2$), the treatment agent may not disrupt the film formation at the surface, instead the treatment agent may become miscible with the second coating layer 112 and adjust the pigment volume concentration such that a color shift occurs. If the concentration and/or dosage amounts are too high i.e., above 2.42 g/m², the treatment agent may migrate to the surface of the second coating layer 112a and precipitate out forming a layer of white crystals on the surface of the second coating layer 112a. For example, in further exemplary embodiments, it is possible to apply the treatment agent in the form of either TSP or MSP at 5 wt % concentration at a dosage rate of 1.6 to 1.9 g/m² to achieve the desired interference between the treatment agent and the second coating layer 112. In alternative embodiments, it is possible to apply MSP at 9 wt % concentration and at a dosage rate of 1.74 g/m² or alternatively at 5 wt % at a dosage rate of 0.97 g/m² to 2.58 g/m² to achieve the desired interference between the treatment agent and the second coating layer 112. It is also possible to alter the wt. % concentration such as for example between 3.75 wt. % and 10 wt. % and adjust the application dosage amounts accordingly such that the total amount of treatment agent applied to the second coating layer is less than 2.42 g/m² to achieve the desired effect.

Test Results:

A sample of a smooth substrate was coated with first coating layer and a second coating layer wherein the second coating layer was a commercially available exterior paint to determine the gloss levels of that paint. A further sample of textured substrate was also coated with first and second coating layers as described above to determine the gloss levels of the same commercially available exterior paint on the textured surface. In this instance, the textured surface is a stucco or render type aesthetic that is represented in the embodiment shown in FIG. 1. Further samples of the smooth and textured substrate were coated with samples of the commercially available exterior paint to which a treatment agent was applied in accordance with the present disclosure, wherein the concentration of treatment agent was 5 wt % applied at a dosage rate of 1.6 g/m², with approximately no flash time between the application of the treatment agent and the curing step. The gloss levels when light was shone onto the surface of the coated article at an angle of 60° or 85° to the surface for each of the respective samples are presented below in Table Two. Gloss levels were measured using a gloss meter from BYK Gardner and averaged from a minimum of three separate readings. The coating layers of the commercially available exterior paint were applied at a DFT of 0.04 to 0.05 millimeter. In the below exemplary embodiment, the commercially available exterior paint was James Hardie ColorPlus® technology exterior paint in Boothbay Blue. The gloss levels of untreated coating layers and coating layers when treated with TSP and MSP as outlined above are presented in Table Two below.

TABLE 2

GLOSS LEVELS OF COMMERCIALLY AVAILABLE EXTERIOR PAINT ON SMOOTH AND TEXTURED SUBSTRATES.

| | Control: Commercial Paint | | Commercial Paint + TSP | | Commercial Paint + MSP | |
|---|---|---|---|---|---|---|
| | \multicolumn{6}{c}{Angle of Measurement} | | | | | |
| | 60° | 85° | 60° | 85° | 60° | 85° |
| Smooth | 11.8 | 15.4 | 5.6 | 6.7 | 2.4 | 0.8 |
| Textured | 5.6 | 5 | 3.2 | 2.3 | 0.9 | 0.4 |

It is readily apparent that the topography of a substrate impacts the gloss levels of the commercial paint. The reduction in gloss levels between a smooth surface and a textured surface is approximately 53% at 60° and 68% at 85°. However, it remains desirable to reduce the gloss levels of a commercial paint further to reduce any glossy spots that sometimes appear when using such a commercial paint on a textured surface. The difference between the gloss levels of the smooth control and the commercial paint treated with TSP is approximately 53% at 60° and 56% at 85°. The difference between the gloss levels of the smooth control and the commercial paint treated with MSP is approximately 80% at 60° and 95% at 85°. The difference between the gloss levels of the textured control and the commercial paint treated with TSP is approximately 43% at 60° and 54% at 85°. The difference between the gloss levels of the textured control and the commercial paint treated with MSP is approximately 84% at 60° and 92% at 85°. Surprisingly, the combined effect of the texture and the treatment agent reduces the gloss levels of the commercial paint on a smooth surface by approximately 73% at 60° and 85% at 85° when using TSP as the treatment agent and 92% at 60° and 97% at 85° when using MSP as the treatment agent.

It was determined therefore that the impact of applying a commercially available exterior paint to a textured substrate as indicated by the tests above reduces the gloss levels by approximately 53% at 60° and 68% at 85°. Applying a treatment agent to a commercially available exterior paint when used as the second coating layer 112 in accordance with the present disclosure reduces the gloss levels by approximately 73% at 60° and 85% at 85° when using TSP as the treatment agent and 92% at 60° and 97% at 85° when using MSP as the treatment agent when compared to the gloss levels of the untreated commercially available exterior paint on a smooth surface.

Several commercially available exterior paints were tested in accordance with the present disclosure as outlined in Table Three below. The commercially available paints are exterior paints that have low gloss levels when applied to a smooth substrate. The commercially available exterior paints were selected to determine if the methods described herein are compatible with different solvent or carrier systems of a coating compositions. As before, the gloss levels were measured using a gloss meter from BYK Gardner when light is shone onto the surface of the coated article at an angle of 60° or 85° to the surface for each of the respective samples and averaged from a minimum of three separate readings. The coating layers of the commercially available exterior paint were applied at a DFT of 0.04 to 0.05 millimeter to a textured substrate as represented by the fiber cement cladding element 100 of FIG. 1. The textured samples were coated with the commercially available exterior paints which were treated with TSP or MSP in accordance with the method of the present disclosure, wherein the concentration of treatment agent was 5 wt % applied at a dosage rate of 1.6 g/m², with approximately no flash time between the application of the treatment agent and the curing step.

TABLE 3

GLOSS MEASUREMENTS OF COMMERCIALLY AVAILABLE PAINTS WITH OR WITHOUT TREATMENT AGENT.

| Paint | Co-solvent Present | Control - Gloss Measurement without treatment agent | | Gloss Measurement with TSP as treatment agent | | Gloss Measurement with MSP as treatment agent | |
|---|---|---|---|---|---|---|---|
| | | 60° | 85° | 60° | 85° | 60° | 85 |
| Behr Premium Plus exterior flat | Ethylene Glycol | 2.1 | 0.6 | 1.8 | 0.5 | 1.9 | 0.6 |
| Sherwin-Williams Emerald Exterior paint | Bis(1,2,2,6,6-Pentamethyl-4-Piperidinyl) Sebacate | 3.7 | 2.4 | 2.2 | 1.5 | 2.1 | 1.3 |
| Sherwin-Williams A-100 exterior paint | Tetraethylene glycol di(2-ethylhexanoate | 3 | 2.6 | 2.5 | 1.5 | 2.4 | 1.4 |
| PPG Glidden premium exterior paint | Ethylene Glycol; Heavy Paraffinic Oil | 4 | 2.3 | 2.8 | 1.6 | 3.2 | 1.6 |

The percentage difference between the untreated control sample and those samples treated with MSP And TSP respectively remains significant because the gloss level of the coating sample was low in the first instance. It was held that the small reduction in gloss levels of commercially available exterior paints when applying both TSP and MSP as treatment agents in accordance with the present disclosure provided additional reduction to the gloss level whilst retaining the durability required of an exterior paint system.

In addition to the above, other low gloss paint systems suitable for exterior application such as those that include fillers, such as for example, silica to reduce the gloss levels of the coating composition were also examined. Such low gloss paint systems were exemplified by James Hardie ColorPlus® technology exterior paint. As before, the gloss levels were measured using a gloss meter from BYK Gardner when light is shone onto the surface of the coated article at an angle of 60° or 85° to the surface for each of the respective samples and averaged from a minimum of three separate readings. The coating layers of James Hardie ColorPlus® technology exterior paint in Gray Slate was applied at a DFT of 0.04 to 0.05 millimeter to a textured substrate as represented by the fiber cement cladding element 100 of FIG. 1. The textured samples were coated with the commercially available exterior paints which were treated with TSP or MSP in accordance with the method of the present disclosure, wherein the concentration of treatment agent was 5 wt % applied at a dosage rate of 1.6 g/m², with approximately no flash time between the application of the treatment agent and the curing step. The results are presented below in Table Four.

The percentage difference between the untreated control sample and those samples treated with MSP and TSP respectively is small. Without wishing to be bound by theory, there is little reduction in the gloss levels in this system because film formation at the surface was already disrupted due to the presence of additional filler materials which have increased the PVC of the coating system and therefore reduced the gloss levels.

The flash time between application of the treatment agent to the wet uppermost coating layer and curing the treated uppermost coating layer until film formation has completed impacts the interaction between the treatment agent and the uppermost coating layer. Without wishing to be bound by theory, it is understood that the interaction stops after drying the treated uppermost coating layer and film formation has completed. Accordingly, the impact of flash time was investigated. Gloss levels were measured at timed intervals after a textured sample was coated with a second coating layer of James Hardie ColorPlus® technology exterior paint in Boothbay Blue and treatment agents were applied in accordance with the present disclosure, wherein the concentration of treatment agent was 5 wt % applied at a dosage rate of 1.6 g/m², with the amount flash time between the application of the treatment agent and the curing step indicated in Table 5. In this instance, the textured surface is a stucco or render type aesthetic that is represented in the embodiment shown in FIG. 1. In the experiments below, each sample was heated in an oven at 105° C. to accelerate curing time. It was determined that the interaction between the treatment agent and the second coating layer which caused the maximum disruption leading to the desired gloss level occurred when

TABLE 4

GLOSS MEASUREMENTS OF A JAMES HARDIE PAINT WITH AND WITHOUT TREATMENT AGENT.

| Paint | Control - Gloss Measurement without treatment agent | | Gloss Measurement with TSP as treatment agent | | Gloss Measurement with MSP as treatment agent | |
|---|---|---|---|---|---|---|
| | 60° | 85° | 60° | 85° | 60° | 85° |
| James Hardie ColorPlus ® technology low gloss exterior paint | 2.9 | 1.3 | 2.4 | 1.3 | 2.5 | 1.2 | the treated second coating layer was cured immediately after application of the treatment agent or at least between 0.5 and 6 mins.

Gloss levels were measured using a gloss meter from BYK Gardner and averaged from a minimum of three separate readings. The coating layers of the commercially available exterior paint were applied at a DFT of 0.04 to 0.05 millimeter. The results of the study are presented below in Table Five.

TABLE 5

FLASH TIME EFFECT ON GLOSS LEVELS.

| Flash Time | TSP | | MSP | |
|---|---|---|---|---|
| (Minutes) | 60° | 85° | 60° | 85° |
| 0 | 3.6 | 3.1 | 1.5 | 1.1 |
| 0.5 | 3.5 | 3.2 | 2.3 | 1.5 |
| 1 | 3.9 | 3.4 | 2.6 | 1.8 |
| 2 | 4.5 | 3.8 | 4.7 | 4.3 |
| 3 | 4.5 | 3.5 | 5.1 | 4.5 |
| 5 | 4.9 | 4.4 | 4.9 | 4.3 |
| 10 | 5.2 | 4.6 | 5.5 | 4.2 |
| 20 | 6.1 | 6.5 | 5.3 | 4.3 |

It was desired that when applying the treatment agent to the second coating layer that the treatment agent would not impact the color or durability of the second coating layer. Table Six below, shows the gloss measurements of a control sample comprising a textured substrate in accordance with the substrate shown in FIG. 1 which has been coated in accordance with the present disclosure including a second coating layer comprising James Hardie ColorPlus® technology exterior paint with and without having any treatment agent applied. The treatment agent comprising TSP and MSP at the concentration and dosage levels previously applied. In addition to measuring the gloss levels of the treated and untreated cured second coating layers, colorimetry studies were carried out using a colorimeter from X-Rite. The data presented below is the average of at least three data points. It was visibly apparent that there was little impact to the color of the James Hardie ColorPlus® technology exterior paint tested. This was reinforced by the color measurements obtained via the colorimetry studies carried out.

TABLE 6

GLOSS AND COLOR MEASUREMENTS OF A CONTROL AND TREATED SAMPLES.

| | Gloss Measurement | | Colour Measurement | | |
|---|---|---|---|---|---|
| | 60° | 85° | L | a | b |
| Control | 5.0 | 3.7 | 55.5 | −1.35 | 0.86 |
| TSP | 3.3 | 2.5 | 55.33 | −1.42 | 1.09 |
| MSP | 1.5 | 1.0 | 55.55 | −1.36 | 1.1 |

In each of the above tests that were carried out the DFT of the second coating layer was between 0.04 millimeter and 0.05 millimeter. Test were also carried out when the DFT of the second coating layer was increased to 0.1 millimeter. Although the gloss measurements taken were slightly different, the overall effect of the treatment agent on the gloss levels remained similar. For example, the control comprised a textured substrate in which the second coating layer was James Hardie ColorPlus® technology exterior paint without having any treatment agent applied in which the DFT was 0.1 millimeter. The gloss measurement at 60° and 85° was 7.0 and 7.4 respectively. Textured samples which also had James Hardie ColorPlus® technology exterior paint as a second coating layer with a DFT of 0.1 millimeter and which were treated with MSP exhibited a gloss level at 60° and 85° of 4.7 and 4.8 respectively. The percentage difference in gloss levels between the untreated and treated samples is between approximately 33% and 35%.

Although the embodiments have been described with reference to specific examples, it will be appreciated by those skilled in the art that the disclosure may be embodied in many other forms.

It is also contemplated that various combinations or sub-combinations of the specific features and aspects of the embodiments may be made and still fall within the scope of the disclosure. Accordingly, it should be understood that various features and aspects of the disclosed embodiments can be combined with or substituted for one another in order to form varying modes of the disclosed embodiment. Thus, it is intended that the scope of the present disclosure herein disclosed should not be limited by the particular disclosed embodiments described above but should be determined only by a fair reading of the claims that follow.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A coated fiber cement cladding element comprising:
    a front face, a rear face and a side face, wherein the rear face is spaced apart from front face and the side face is between and contiguous to the front face and the rear face and wherein the front face further comprises a textured finish;
    a first coating layer on at least a portion of the front face of the fiber cement cladding element; and
    a second coating layer on at least a portion of the first coating layer on at least a portion of the front face of the fiber cement cladding element, wherein the second coating layer comprises at least one layer of a low gloss coating composition which has a light reflectance of 5% or less when light is shone onto the surface of the coated fiber cement cladding element at an angle of 60° or 85° to the surface, wherein the layer of low gloss coating composition comprises a paint composition and a treatment agent incorporated therein, wherein the treatment agent is disposed immediately below the uppermost surface of the paint composition to disrupt film formation of the uppermost surface, thereby reducing the light reflectance of the paint composition without impacting the integrity and durability of the paint composition; and
    wherein the wt. % concentration of the treatment agent is between 3.75 wt. % and 10 wt. %.

2. The coated fiber cement cladding element of claim 1, wherein the paint composition is suitable for use as an exterior coating composition, the paint composition having a light reflectance of at least 10% or higher when light is shone on a smooth surface coated with the paint composition at an angle of 60° or 85° to the surface.

3. The coated fiber cement cladding element of claim 1, wherein the second coating layer comprises a dried film thickness of between approximately 0.04 millimeter and 0.1 millimeter.

4. The coated fiber cement cladding element of claim 1, wherein the treatment agent is either trisodium phosphate.

5. The coated fiber cement cladding element of claim 1, wherein the total amount of treatment agent incorporated in the paint composition is less than 2.42 g/m$^2$.

6. The coated fiber cement cladding element of claim 1, wherein the treatment agent is monosodium phosphate.

7. The coated fiber cement cladding element of claim 1, wherein the wt. % concentration of the treatment agent is 5 wt. % and is incorporated in the paint composition in an amount between 1.6 g/m$^2$ and 1.9 g/m$^2$.

8. The coated fiber cement cladding element of claim 1, wherein the wt. % concentration of the treatment agent is 9 wt. % and is incorporated in the paint composition in an amount of 1.74 g/m$^2$.

9. The coated fiber cement cladding element of claim 1, wherein the wt. % concentration of the treatment agent is 5 wt. % concentration and is incorporated in the paint composition in an amount between 0.97 g/m$^2$ and 2.58 g/m$^2$.

10. The coated fiber cement cladding element of claim 1, wherein the first coating layer comprises a sealer layer.

11. The coated fiber cement cladding element of claim 1, wherein the first coating layer comprises a primer layer.

12. The coated fiber cement cladding element of claim 1, wherein the first coating layer comprises a combined sealer and primer layer.

13. The coated fiber cement cladding element of claim 1, wherein the first coating layer comprises a sealer layer and a primer layer.

14. The coated fiber cement cladding element of claim 1, wherein the textured finish of the front face comprises a stucco or a render finish.

15. The coated fiber cement cladding element of claim 1, wherein the textured finish of the front face comprises a woodgrain aesthetic, a brick aesthetic or a stone aesthetic.

16. The coated fiber cement cladding element of claim 1, comprising a fiber cement composition comprising Portland cement, silica, water and reinforcing fibers.

17. The coated fiber cement cladding element of claim 1, comprising a fiber cement composition comprising between 20 and 40 wt % Portland cement, between 25 and 75 wt % silica, water and between 5 and 15 wt. % of reinforcing fibers.

18. The coated fiber cement cladding element of claim 1, further comprising density modifiers.

19. A coated fiber cement cladding element comprising:
a front face, a rear face and a side face, wherein the rear face is spaced apart from the front face and the side face is between and contiguous to the front face and the rear face and wherein the front face further comprises a textured finish;
a first coating layer on at least a portion of the front face of the fiber cement cladding element; and
an exterior paint layer disposed on the first coating layer, the exterior paint layer comprising a paint composition and trisodium phosphate incorporated therein, wherein the trisodium phosphate is dispersed in the paint composition immediately below the uppermost surface of the paint composition to interfere with film formation on the uppermost surface to reduce light reflectance of the exterior paint layer without changing the pigment volume concentration of the paint composition; and
wherein the wt. % concentration of trisodium phosphate is between 3.75 wt. % and 10 wt. %.

20. A coated fiber cement cladding element comprising:
a front face, a rear face and a side face, wherein the rear face is spaced apart from the front face and the side face is between and contiguous to the front face and the rear face and wherein the front face further comprises a textured finish;
a first coating layer on at least a portion of the front face of the fiber cement cladding element; and
an exterior paint layer disposed on the first coating layer, the exterior paint layer comprising a paint composition and monosodium phosphate incorporated therein, wherein the monosodium phosphate is dispersed in the paint composition immediately below the uppermost surface of the paint composition to interfere with film formation on the uppermost surface to reduce light reflectance of the exterior paint layer without changing the pigment volume concentration of the paint composition; and
wherein the wt. % concentration of monosodium phosphate is between 3.75 wt. % and 10 wt. %.

* * * * *